United States Patent [19]

Foletti et al.

[11] Patent Number: 5,297,060
[45] Date of Patent: Mar. 22, 1994

[54] METHOD AND TOOL FOR THE DIGITIZING OF DRILLING JIGS

[75] Inventors: Sandro Foletti, Piacenza; Franco Cassinari, Podenzano, both of Italy

[73] Assignee: JOBS S.p.A., Piacenza, Italy

[21] Appl. No.: 734,590

[22] Filed: Jul. 23, 1991

[30] Foreign Application Priority Data

Aug. 9, 1990 [IT] Italy .................. 44818 A/90

[51] Int. Cl.$^5$ .............................. G01B 5/03
[52] U.S. Cl. ..................... 364/559; 364/551.02; 364/474.02; 364/474.32; 364/474.34; 33/534; 33/559; 33/503; 73/1 E
[58] Field of Search ............... 364/559, 551.02, 474.02, 364/474.32, 474.34, 474.37; 73/1 E; 33/503, 534, 542, 559, 561; 901/45

[56] References Cited

U.S. PATENT DOCUMENTS

| | | | |
|---|---|---|---|
| 4,041,466 | 8/1977 | Stuart | 364/551.02 |
| 4,400,118 | 8/1983 | Yamahage et al. | 364/474.32 |
| 4,532,713 | 8/1985 | Feichtinger | 33/559 |
| 4,572,998 | 2/1986 | Nozawa et al. | 364/474.32 |
| 4,755,949 | 7/1988 | Shiratori et al. | 364/474.34 |
| 4,788,481 | 11/1988 | Niwa | 364/474.02 |
| 4,888,877 | 12/1989 | Enderle et al. | 33/559 |
| 4,945,979 | 8/1990 | Cullen et al. | 901/45 |
| 5,207,554 | 5/1993 | Asakawa et al. | 901/45 |

FOREIGN PATENT DOCUMENTS 2168271  6/1986  United Kingdom ........... 364/474.37

Primary Examiner—Jack B. Harvey
Assistant Examiner—Hal D. Wachsman
Attorney, Agent, or Firm—Notaro & Michalos

[57] ABSTRACT

A method for digitizing drilling jigs comprising: insertion in a jig hole of a feeler pin provided with a rounded-shaped head having the same diameter as the hole, such feeler pin being connected to a measuring system suitable for finding its position continuously. The method includes storing of the coordinates of a point on the hole axis nearby the surface of the jig; deep insertion of the feeler pin and finding of the coordinates of a second point on the hole axis nearby the back; and calculation of the axis inclination through the coordinates of the two points found.

2 Claims, 2 Drawing Sheets

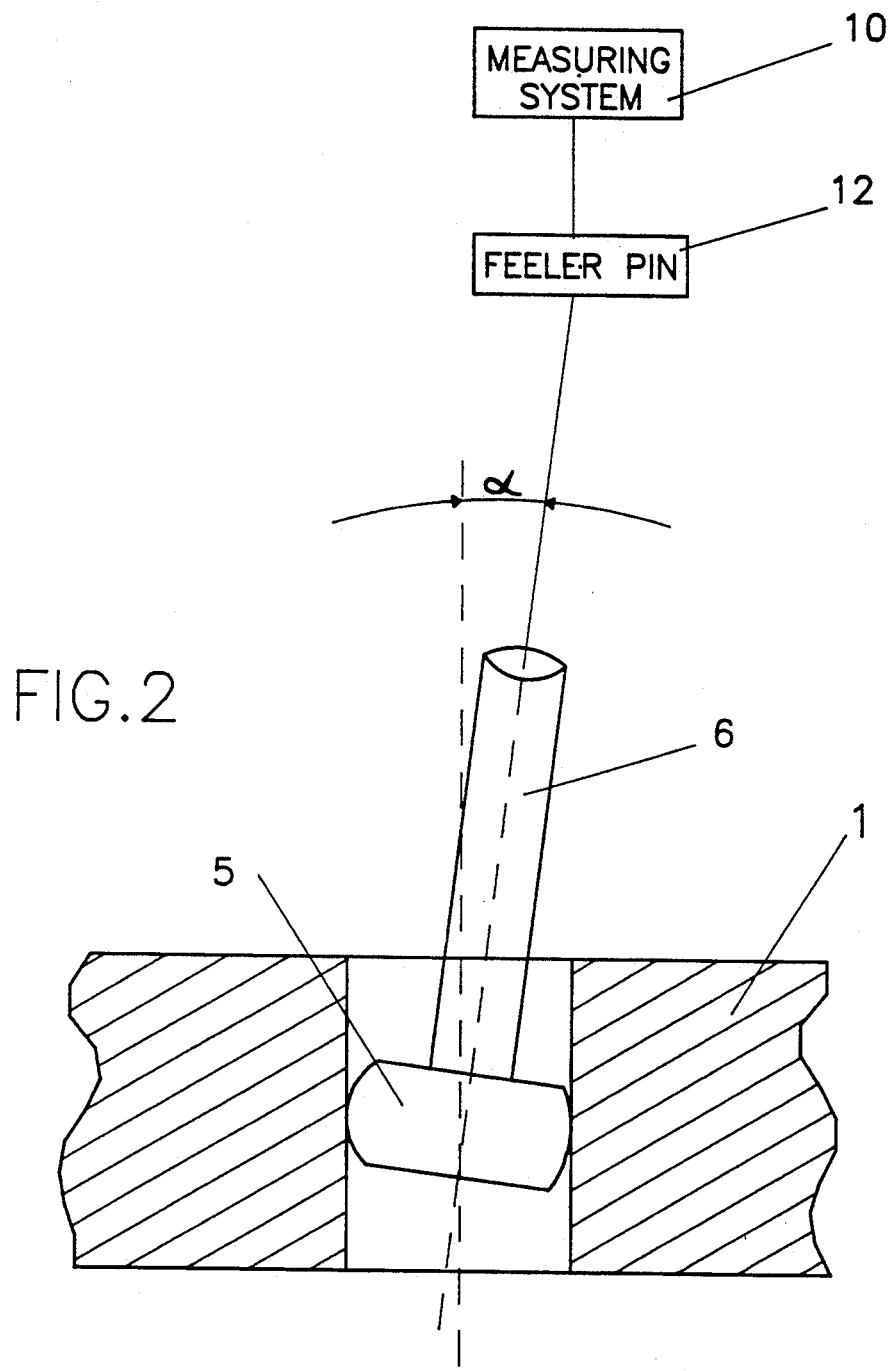

METHOD AND TOOL FOR THE DIGITIZING OF DRILLING JIGS

FIELD AND BACKGROUND OF THE INVENTION

This invention proposes a method for digitizing drilling jigs, i.e., a method which allows measuring in a jig the exact position and inclination of the axes in a set of holes so as to carry out the drilling automatically.

The method can be satisfactorly applied, but not limited to, in the field of aeronautical constructions where, on the one hand, automatization is the trend in manufacturing and assembling and, on the other, a perfect interchangeability of the new parts with the older, e.g. machined through manual systems with jigs and templates, is required.

Until a few years ago, drilling, flaring and riveting for most parts of the airplanes were carried out through mere manual techniques, which means inaccuracy, long time and high costs.

Since the tolerances allowed for working the parts of airplans are very restricted, in case of drilling, flaring and so on, operators were supported by jigs and templates in the correct positioning of the tool.

Recently, machine tools capable of carrying out automatically such machinings have been developed.

Nevertheless, in order to manufacture spare parts for replacing the parts previously manufactured by means of jigs, which are to be perfectly interchangeable, using such new techniques in their production is neither practical nor economical.

As a consequence, every part is still machined by means of jigs. However, means suitable for automatizing every machining as much as possible are more and more required for machinings based on the use of jigs.

SUMMARY OF THE INVENTION

To this aim, this invention proposes a method for digitizing the drilling jigs which enables finding the coordinates of two points placed on the hole axis thorugh a feeler pin.

Knowing such two points makes it possible to calculate a third Point on the straight line passing along the former two points at a set distance from them.

The latter will then be stored. It shows the position of the tool along the machine axes.

BRIEF DESCRIPTION OF THE DRAWINGS

The invention will now be described in detail as an example and the a particular reference to the figures enclosed as follows:

FIG. 2 is a sectional view illustrating the system and the tool according to invention, inserted in a jig hole during the measurement phase.

DESCRIPTION OF THE PREFERRED EMBODIMENT

Figure 1:
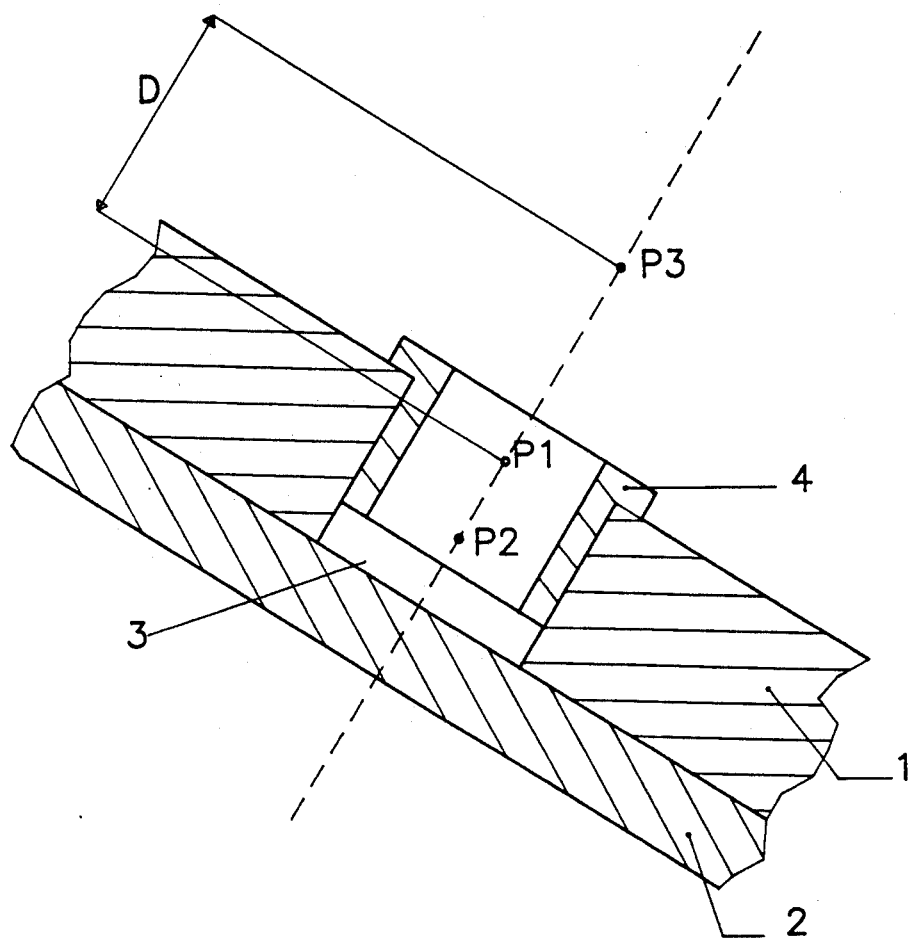
FIG. 1 is a sectional view illustrating a detail of a drilling jig at one of the points to be detected.

With reference to FIG. 1, a drilling jig (1) to be applied to the piece 2 to be machined is shown.

The jig 1 has many holes 3, each provided with a centering bush 4.

The pieces to be machined are generally curved and the inclination in the positions where machinings shall be carried out, is not known.

As a consequence, in order to carry out the different machinings properly, it will be necessary to know the coordinates of a point placed on the hole axis as well as the inclination of that axis in space.

A tool—described below—mounted on a machine provided with some degrees of freedom, in preference at least 6 degrees of freedom, is used for carrying out the set measurements.

Such machines are known and one of them is shown, as an example, in the application for Italian patent 44804 A/88 (which corresponds to U.S. Pat. No. 5,014,542).

This machine is provided with a working head installed in a movable support along three cartesian axes X,Y,Z.

The head can rotate around a pair of orthogonal axes A and C and a tool moving along an axis W is mounted on it.

An analogical feeler pin, Renishaw type, is mounted on this head, which enables finding the coordinates of different points in the space.

The tool of the invention shown in FIG. 2, consists of a head 5 shaping as a sphere or a sphere segment with the same diameter as the bush 4, mounted on a rod 6 connected to three encoders or another measuring system 10 which is connected to the devices governing the machine movements not shown.

Practically, it is possible to clamp the feeler pin 12 of the measuring system 10, and by pushing it in a direction make the machine feed in a same direction at a speed directly proportional to the force exerted on the feeler pin.

Once the position required has been reached, start a in system 10 control enabling the storing of a coordinates of that point by the in the control system.

The above mentioned devices, e.g. feeler pin, encoder and the relevant programs are well-known to the technicians and thus they are not described in detail.

On the other hand, it is important that tile tool shape is that shown, i.e., a sphere segment shape, with the same diameter as the centering bush.

Then it will be possible to bring the machine nearby the hole and insert the tool for the necessary survey with no need for an exact positioning which would require a long time.

In fact, before digitizing, neither the orientation of the hole axis nor the coordinates of the polar axes A and C of the machine, are known, which makes it possible to get the tool axis coincident with the hole axis.

That's why the shape of feeler pins shall be such that it allows the pin entering the hole even when the deviation between the axis is remarkable.

In accordance with the method of the invention, first lead the machine nearby the hole, then insert the tool, stop at the surface and store the position of a first point, e.g. point P1, by means of the numerical control. This is near a front surface of jig 1.

Then insert the tool deeper and repeat the operation storing the coordinates of a second point, e.g. P2. This is near a back surface of jig 1.

The coordinates of the two points being known with respect to an origin system, the space inclination of the segment P1–P2 is known. Through the coordinates of this system, it will then be possible to calculate through given formulae the position of the axes A and C so that the tool axis is oriented as the segment P1–P2.

Through these points known, it will be possible to calculate a third point P3 (FIG. 1) on the hole axis at a preset distance D from P1.

This latter will then be stored by the machine and represents the positioning along the axes X, Y, Z, A and C of the tool that will then move along the axis W for carrying out the drilling.

The distance D is determined previously so as to make it possible during the drilling phase to position the tool preceding the machining at a distance preventing possible collisions between the tool and the piece when passing from a hole machining to the next. In order to properly apply the method described, it is necessary that the tool diameter is equal to the hole diameter in the jig and that the distance between the points P1 and P2 is as longer as possible.

It is clear that the deviation between the ideal point and the point actually set is proportional to the difference between the feeler pin diameter and that of the centering bush, and that excessively short distances between the points P1 and P2 may cause remarkable angular errors in spite of the exact matching between the feeler pin and bush.

That's why a truncated sphere shaped tool is to be preferred, which enables a greater range inside the bush.

Through the method described it is therefore possible to find the exact position and inclination of the holes in a drilling jig and then to carry out the different machinings automatically.

The automation of this production process decreases the working time remarkably while increasing the quality of the machining, i.e., carrying out the drilling by means of an automatic programme by using however a centering apparatus.

By placing the drilling jig in the same position and orientation, after replacing the piece to be machined, it will be possible to use the same programme for machininig more pieces with tools different in length.

An expert in the field will be then able to design several modifications and changes which shall be deemed as falling within the scope of this invention.

We claim:

1. A method for locating a tool positioning point on the axis of a jig hole in a jig having a front surface and a back surface, for use in digitizing drilling jigs, the hole having a known diameter and the method comprising:
    inserting a feeler pin provided with a rounded head having the same diameter as the hole, into the jig hole;
    providing a measuring system suitable for continously finding a position of the head in the hole and on the hole axis;
    storing coordinates of the location of the head at a first point in the hole and on the hole axis, near a front surface of the jig;
    inserting the feeler pin and head deeper into the hole;
    storing coordinates of a second location of the head at a second point in the hole and on the hole axis near a back surface of the jig;
    calculating an inclination of the jig hole axis using the coordinates of the first and second points; and
    calculating a third point on the hole axis which is external of the hole and at a distance which is greater than a distance between the front surface of the jig and a maximum depth reached by the head in the hole, said third point being used as the tool positioning point along the axis of the hole.

2. A method according to claim 1 including providing a plurality of encoders in the measuring system.

* * * * *